United States Patent [15] 3,662,454

Miller [45] May 16, 1972

[54] METHOD OF BONDING METALS TOGETHER

[72] Inventor: Anthony Zbigniew Miller, Flemington, N.J.

[73] Assignee: RCA Corporation

[22] Filed: Mar. 18, 1970

[21] Appl. No.: 20,538

[52] U.S. Cl. ....... 29/470.1, 29/488, 29/504
[51] Int. Cl. ....... B23k 21/00
[58] Field of Search ....... 29/470.1, 504, 488, 497.5

[56] References Cited

UNITED STATES PATENTS

| | | | |
|---|---|---|---|
| 2,946,119 | 7/1960 | Jones et al. | 29/470.1 X |
| 3,029,666 | 4/1962 | Lovins | 29/470.1 X |
| 3,384,283 | 5/1968 | Mims | 29/470.1 X |

OTHER PUBLICATIONS

Handbook of Chemistry and Physics page F–18.

*Primary Examiner*—John F. Campbell
*Assistant Examiner*—Richard Bernard Lazarus
*Attorney*—Glenn H. Bruestle

[57] ABSTRACT

A body of a soft metal, such as gold, silver, or copper, is ultrasonically bonded to another metal body by providing a thin layer of a harder material, such as nickel, iron, cobalt, magnesium, aluminum, palladium, germanium, or silicon, between the surface of the soft metal body and the other metal body. The layer of the harder material is thin enough that it is worn away during the application of the ultrasonic energy so as to provide the bond directly between the soft metal body and the other body.

3 Claims, 1 Drawing Figure

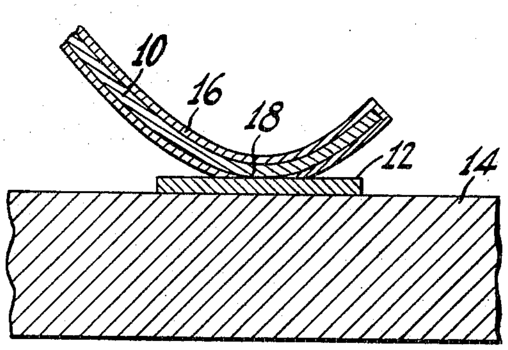
INVENTOR
ANTHONY Z. MILLER
BY
Donald S. Cohen
Attorney

METHOD OF BONDING METALS TOGETHER

BACKGROUND OF INVENTION

The present invention relates to a method of bonding metal bodies together, and more particularly to a method of ultrasonically bonding a body of a soft metal to another metal body.

Various types of electrical components include a terminal wire of an electrically conductive metal bonded to a metal contact on the electrical component. One method which has been used to bond the terminal wire to the contact is ultrasonic bonding such as described in U.S. Pat. No. 2,946,119 to J. B. Jones etal, issued July 28, 1960, entitled "Method and Apparatus Employing Vibratory Energy For Bonding Metals." However, it has been found that the ultrasonic bonding method does not consistently provide strong bonds between wires of certain soft metals, such as gold, silver, copper and the like, and the metal contact. It is believed that one factor which may contribute to the poor bonding of the soft metal wires to the metal contacts is that the soft metal may not satisfactorily transmit the ultrasonic vibratory energy. Also, the joinder of two metal bodies by ultrasonic bonding is believed to result from the applied elastic vibratory energy causing the mating surfaces of the two bodies to rub against each other in a manner so as to disrupt the interfacial film geometry. This more or less destroys the interfacial film permitting nascent metal surfaces to come together and form the bond. It is believed that another factor which adversely affects the obtaining of a good bond between the soft metal body and the other metal body is that soft metal is too soft to effectly destroy the interfacial film on the other metal body so as to obtain the nascent metal surfaces.

SUMMARY OF INVENTION

A soft metal body, an other metal body, and an intermediate harder metal layer are held in contact with each other and elastic vibratory energy applied to one of the bodies until the harder metal layer is worn away and the soft metal body adheres to the other metal body.

BRIEF DESCRIPTION OF DRAWING

The FIGURE of the drawing is a sectional view of a terminal wire bonded to a contact of an electrical component in accordance with the method of the present invention.

DETAILED DESCRIPTION

In the method of the present invention a body of a soft metal, such as gold, silver or copper, is ultrasonically bonded to a body of another metal. The soft metal body may be in the form of a wire, strip or the like, and the other metal body may be a solid body or a film. The bonding is achieved by providing between the portions of the surfaces of the bodies which are to be bonded together a thin layer of a metal layer of a metal harder than the soft metal body, such as nickel, iron, cobalt, magnesium, aluminum, palladium, germanium or silicon. Preferably, the harder metal is coated on the surface of the soft metal body, such as by electroplating or electroless plating. The coated soft metal body is held in contact with the surface of the other body and ultrasonic elastic vibratory energy is applied to one of the bodies such as in the manner described in U.S. Pat. No. 2,946,119.

During the application of the elastic vibratory energy the harder metal layer rubs against the surface of the other metal body disrupting the interfacial film on the surface of the other metal body so as to expose a nascent metal surface. At the same time the harder metal film is also worn away so as to expose a nascent metal surface of the soft metal body. The nascent metal surfaces of the soft metal body and the other metal body then come into intimate contact and adhere together to form the bond. The harder metal film should be thick enough to cause a disruption of the interfacial film on the surface of the other metal body, yet thin enough so that it can be worn away to expose the soft metal body. A harder metal film of between about 200A and 25,000A in thickness will achieve a good bond between the soft metal body and the other metal body.

Referring to the drawing there is shown a terminal wire 10 of a soft metal, such as gold, silver or copper, bonded to a metal contact film 12 on an electrical component 14, such as a wafer of semiconductor material, by the method of the present invention. The wire 10 is coated with a layer 16 of a metal harder than the metal of the wire. It should be noted that at the bond interface 18 the harder metal film 16 has been worn away so that the bond is directly between the soft metal wire 10 and the metal of the contact film 12.

The ultrasonic bonding method of the present invention wherein a harder metal film is provided between the soft metal body and the other metal body during the application of the ultrasonic elastic vibratory energy more consistently achieves a good bond between the two metal bodies than if the harder metal film was not included. For example, 60 uncoated gold wires and 60 gold wires plated with a film of nickel approximately 2,000A thick were individually ultrasonically bonded to a film of gold plated kovar under the same holding pressures and ultrasonic power. The strength of the body between each of the wires and the metal film was tested by pulling the wires under an increasing force until break load force is reached. Of the 60 uncoated gold wires, 24 pulled away from the metal film whereas of the 60 coated gold wires only 7 pulled away from the metal film. Thus, the harder metal coating on the gold wires provided a greater number of good bonds between the gold wires and the metal film.

I claim:

1. A method of bonding a body of a soft metal selected from the group consisting of gold, silver, and copper to another metal body comprising the steps of
   a. disposing a thin layer of a harder metal selected from the group consisting of nickel, iron, cobalt, magnesium, aluminum, palladium, germanium, and silicon between the soft metal body and the other metal body, and
   b. applying elastic vibratory energy to one of said bodies until the harder metal layer is worn away and the soft metal body is adhered to the other metal body.

2. A method in accordance with claim 1 in which the harder metal layer is coated on the surface of the soft body.

3. A method in accordance with claim 2 in which the harder metal film is of a thickness of between about 200A and 25,000A.

* * * * *